United States Patent
Han et al.

(10) Patent No.: US 7,874,004 B2
(45) Date of Patent: Jan. 18, 2011

(54) METHOD OF COPYING AND REPRODUCING DATA FROM STORAGE MEDIUM

(75) Inventors: Sung-hyu Han, Seoul (KR); Yun-sang Kim, Suwon-si (KR); Yang-lim Choi, Seongnam-si (KR); Yong-kuk You, Suwon-si (KR); Hee-chul Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1343 days.

(21) Appl. No.: 11/010,280

(22) Filed: Dec. 14, 2004

(65) Prior Publication Data

US 2005/0154907 A1 Jul. 14, 2005

(30) Foreign Application Priority Data

Jan. 10, 2004 (KR) .................. 10-2004-0001813

(51) Int. Cl.
*G06F 7/04* (2006.01)

(52) U.S. Cl. .................. 726/26; 713/193; 380/277

(58) Field of Classification Search .............. 726/26; 380/277; 713/193
See application file for complete search history.

(56) References Cited

U.S. PATENT DOCUMENTS

| | | | |
|---|---|---|---|
| 5,555,304 A | | 9/1996 | Hasebe et al. |
| 6,516,064 B1 * | | 2/2003 | Osawa et al. .............. 380/201 |
| 7,020,780 B1 * | | 3/2006 | Mochizuki .................. 713/193 |
| 2002/0157011 A1 * | | 10/2002 | Thomas III .................. 713/193 |

FOREIGN PATENT DOCUMENTS

| | | | |
|---|---|---|---|
| CN | 1274922 A | | 11/2000 |
| CN | 1141707 C | | 3/2004 |
| EP | 1054398 A2 * | | 11/2000 |
| JP | 2000-113587 A | | 4/2000 |
| JP | 2000-330871 A | | 11/2000 |

(Continued)

OTHER PUBLICATIONS

Bruce Schneier: "Applied Cryptograhpy" 1996, Katherine Schowalter, XP002426686, pp. 28-29, 32-34, and 48.

(Continued)

*Primary Examiner*—Kimyen Vu
*Assistant Examiner*—Yogesh Paliwal
(74) *Attorney, Agent, or Firm*—Sughrue Mion, PLLC

(57) ABSTRACT

Provided is a method of copying data stored in a first storage medium to a second storage medium. The method includes recording the encrypted data stored in the first storage medium on the second storage medium; reproducing a first content key, which is used to encrypt the encrypted data, using a first drive into which the first storage medium is loaded; encrypting the first content key; sending the encrypted first content key to a second drive into which the second storage medium is loaded; and recording the encrypted first content key on the second storage medium. In this method, encrypted data stored in a first storage medium is sent to a second storage medium via a host without decrypting the encrypted data, thereby preventing the data from being hacked or being accessed by unauthorized users and increasing a speed of copying the encrypted data.

7 Claims, 6 Drawing Sheets

FOREIGN PATENT DOCUMENTS

| | | |
|---|---|---|
| JP | 2002-203367 A | 7/2002 |
| JP | 2002-304808 A | 10/2002 |
| JP | 2004-72134 A | 3/2004 |
| KR | 1999-0045452 A | 6/1999 |
| KR | 2001-0078159 A | 8/2001 |
| KR | 2001-0080117 A | 8/2001 |
| KR | 2001-0082666 A | 8/2001 |
| KR | 2003-0069985 A | 8/2003 |
| WO | WO 00/62290 A1 | 10/2000 |
| WO | WO 03/034428 A2 | 4/2003 |

OTHER PUBLICATIONS

"Volume and File Structure of CDROM for Information Interchange" Standard ECMA, vol. 119, No. 2, Dec. 1987, pp. 1-4, I, XP002939715.

Anonymous: "The GNU Privacy Handbook" Internet Article, [Online]1999, XP002426841, Retrieved from the Internet: URL:http://www.gnupg.org/gph/en/manual.html> [retrieved on Mar. 27, 2007].

Korean Office Action issued May 13, 2010, in counterpart Korean Application No. 10-2004-0001813.

* cited by examiner

METHOD OF COPYING AND REPRODUCING DATA FROM STORAGE MEDIUM

This application claims the priority of Korean Patent Application No. 2004-1813 filed on Jan. 10, 2004, in the Korean Intellectual Property Office, the disclosure of which is incorporated herein in its entirety by reference.

BACKGROUND OF THE INVENTION

1. Field of the Invention

The present invention relates to a method of copying data from one storage medium to another storage medium, and more particularly, to a data copying method in which data stored in one storage medium is encrypted and a result of encrypting is recorded on another storage medium via a host, thereby preventing the data from being hacked by unauthorized users and increasing a speed of copying the data.

2. Description of the Related Art

In general, optical discs, which are developed as large capacity storage medias, are classified into a compact disc (CD) that stores music data, a CD-read only memory (CD-ROM) that stores computer data, and digital versatile disk (DVD) that stores video data.

Also, such optical discs can be classified into a read-only type on which data was recorded during disc manufacture and a recordable type which allows a user to record data thereon. Further, the recordable type may be classified into a write once type and a rewritable type. Transfer of data may be made from one disc to another disc or from a hard disk installed in a user's computer to a disc. Such transfer of data is referred to as disk copy.

In general, copyrighted contents is encrypted and a result of encrypting is stored in a storage medium. In detail, such contents are encrypted using a content key and a result of encrypting is stored in a storage medium. The content key is reproduced using a disk drive that reproduces the contents from the storage medium or based on information stored in the storage medium.

FIG. 1 illustrates a conventional method of copying contents stored in a first disc 110 to a second disc 120. Referring to FIG. 1, the first disc 110 stores contents E(K1, Contents) encrypted using a content key K1. When the first disc 110 is loaded into a first drive 112, the first drive 112 reproduces the content key K1 using information stored either in the first disc 110 or the first drive 112.

The information stored in the first disc 110 includes a disc identifier (ID), a random number, and a renewal key block. The disc ID denotes a disc identification number and the renewal key block denotes a set of drive keys that enable identification of unauthorized apparatuses. The information stored in the first drive 112 includes a drive ID, which is a drive identification number, and a device key set. The device key set indicates a set of keys that are provided only to authorized apparatuses for identification of unauthorized apparatuses.

After reproducing the content key K1, the first drive 112 decrypts the contents E(K1, Contents), which has been encrypted and stored in the first disc 110, using the content key K1, thereby obtaining decrypted contents 134. The decrypted contents 134 is sent to a second drive 122 via a host 130.

The second drive 122 reproduces a content key K2 based on information stored in a second disc 120 and information stored in the second drive 122. The information stored in the second disc 120 and the information stored in the second drive 122 are equivalent to that stored in the first disc 110 and that stored in the first drive 112, respectively. Accordingly, a detailed description thereof will be omitted here.

Next, the second drive 122 encrypts the decrypted contents 134 using the content key K2, thereby obtaining encrypted contents E(K2, Contents) 124. The encrypted contents E(K2, Contents) 124 is recorded on the second disc 120.

As described above, the encrypted contents E(K1, Contents) stored in the first disc 110 is decrypted, re-encrypted, and then copied to the second disc 120. A reason for re-encrypting the decrypted content 134 using the content key K2 is to enable a new drive, other than the first and second drives 112 and 122, to reproduce the content key K2 and decrypt the encrypted contents E(K2, Contents) stored in the second disc 120, using the content key K2. In other words, since a content key is reproduced using disc information, the new drive cannot decrypt the encrypted contents E(K2, Contents) stored in the second disc 120 using the previous key K1.

In the conventional data copying method, contents that are not encrypted are, however, transmitted from the first drive 112 to the host 130 and then to the second drive 122, thus guaranteeing security for the contents. For instance, such contents may be intercepted or hacked by unauthorized users who access the host 130.

Further, the conventional data copying method is disadvantageous in that in a considerable amount of time is required in copying contents from one storage medium to another storage medium, since the contents must be encrypted, decrypted, and re-encrypted.

SUMMARY OF THE INVENTION

The present invention provides a method of copying data from one storage medium to another storage medium while providing security for the data when the data is sent via a host and reducing a time required for data copy.

According to an aspect of the present invention, there is provided a method of copying encrypted data stored in a first storage medium to a second storage medium, the method comprising recording the encrypted data stored in the first storage medium on the second storage medium; reproducing a first content key, which is used to encrypt the encrypted data, using a first drive into which the first storage medium is loaded; encrypting the first content key; sending the encrypted first content key to a second drive into which the second storage medium is loaded; and recording the encrypted first content key on the second storage medium.

Encrypting the first content key is performed using a public key infrastructure.

Encrypting the first content key and sending the encrypted first content key to the second drive comprise encrypting the first content key using a public key of the second drive; sending the encrypted first content key to the second drive; and decrypting the encrypted first content key using a private key of the second drive, the private key corresponding to the public key of the second drive.

Encrypting the first content key comprises reproducing a second content key based on disc information stored in the second storage medium; and encrypting the first content key using the second content key.

The method further includes recording a copy flag in a predetermined section of the second storage medium.

According to another aspect of the present invention, there is provided a method of reproducing data, which is encrypted using an encrypted first content key, from a first storage medium, the method comprising reproducing a second content key using disc information stored in the first storage medium; decrypting the encrypted first content key using the second content key; and decrypting the encrypted data using the decrypted first content key, wherein the first content key is encrypted using the second content key, which can be reproduced using the disc information stored in the first storage medium, and stored in the first storage medium.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 2:
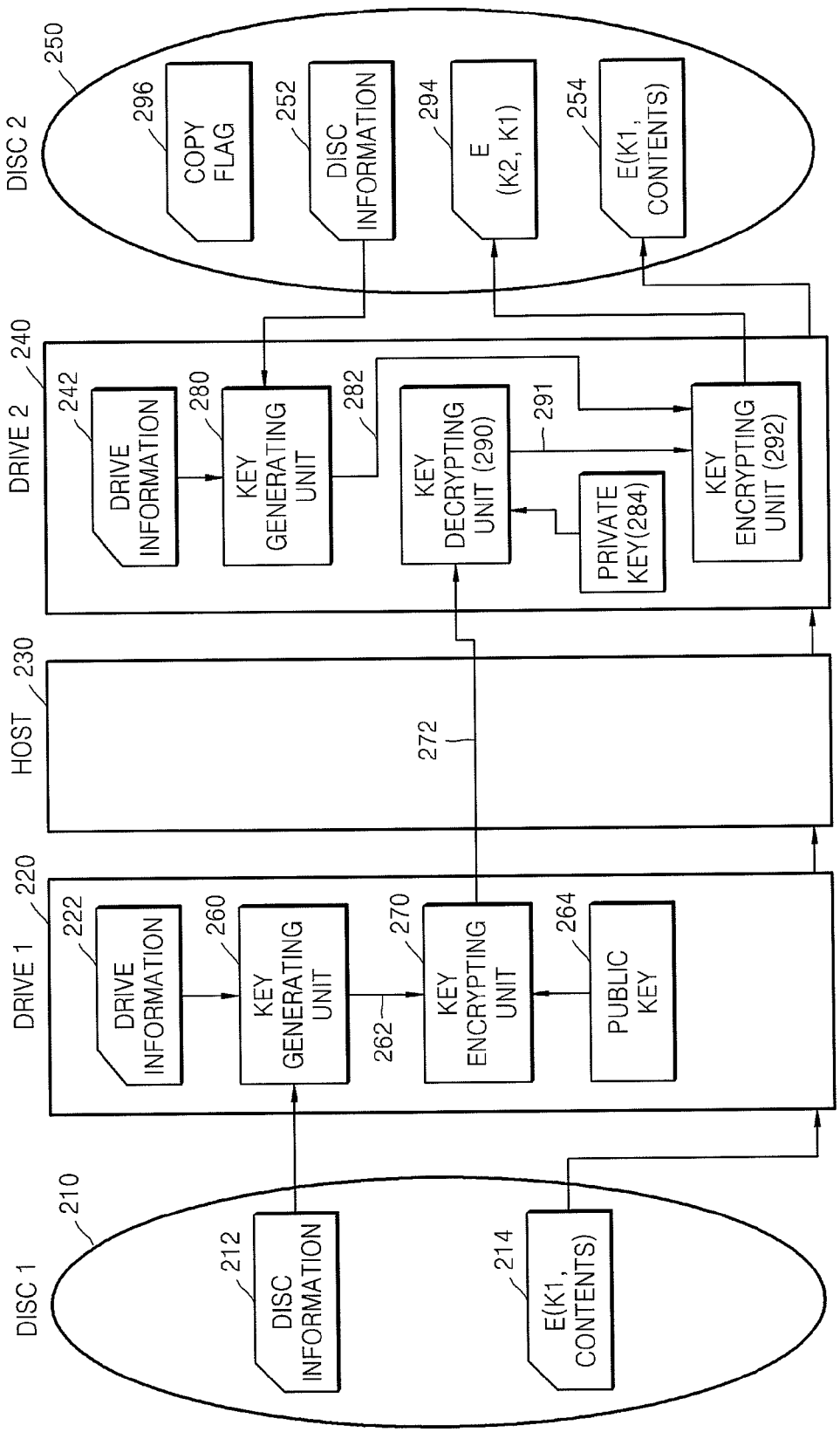
FIG. 2 illustrates a method of copying data stored in one storage medium to another storage medium, according to an embodiment of the present invention.

FIG. 2 illustrates a method of copying data from a first disc 210 to a second disc 250, according to an embodiment of the present invention. The first disc 210 stores disc information 212 and encrypted contents E(K1, Contents) 214. The disc information 212, which is used to reproduce a content key K1 262, includes a disc identifier (ID) and a renewal key block. The contents E(K1, Contents) 214 is encrypted using the content key K1 262. Drive information 222 stored in a first drive 220 includes a drive ID, a device key set, and an encrypted media key.

When the first disc 210 is loaded into the first drive 220, a key generating unit 260 of the first drive 220 reproduces the content key K1 262. Next, a key encrypting unit 270 of the first drive 220 encrypts the content key K1 262 using a public key K_pub_dev2 264 of a second drive 240, thus obtaining an encrypted content key E(K_pub_dev2, K1) 272. The public key K_pub_dev2 264 of the second drive 240 is transmitted from the second drive 240 to the first drive 220, using a public key infrastructure (not shown).

The encrypted content key E(K_pub_dev2 K1) 272 is sent to the second drive 240 via a host 230.

Also, the encrypted contents E(K1, Contents) 214 stored in the first disc 210 is sequentially transmitted to the first drive 220, the host 230, and the second drive 240, and then is recorded on the second disc 250. During the transmission, the encrypted contents E(K1, Contents) 214 is neither decrypted nor encrypted. In particular, since the encrypted contents E(K1, Contents) 214 is transmitted to the host 230, thereby preventing it from being hacked by unauthorized users.

When the second disc 250 is loaded into the second drive 240, the second drive 240 reproduces a content key K2 282 using disc information 252 and drive information 242. Unlike the first drive 220, the content key K2 282 reproduced by the second drive 240 is not used in encrypting contents. That is, since the encrypted content E(K1, Contents) stored in the first disc 210 is recorded as encrypted contents E(K1, Contents) 254 on the second disc 250 without a decrypting process, an additional encrypting process is not required, and thus, the content key K2 282 is not used.

The encrypted content key E(K_pub_dev2, K1) 272, which is encrypted by the first drive 220 using the public key 264 of the second drive 240, is transmitted to a key decrypting unit 290 of the second drive 240. The key decrypting unit 290 decrypts the encrypted content key E(K_pub_dev2, K1) 272 using a private key 284 of the second drive 240, thus obtaining a content key K1 291 of the first drive 220.

The content key K1 291 is transmitted to a key encrypting unit 292 of the second drive 240. Next, the key encrypting unit 292 obtains an encrypted content key E(K2, K1) 294 of the first drive 220 by encrypting the content key K1 291 using the content key K2 282, of the second drive 240, which is reproduced by a key generating unit 280. The encrypted content key E(K2, K1) 294 is recorded on the second disc 250.

Before being recorded on the second disc 250, the encrypted contents E(K1, Contents) 254 has already been encrypted using the content key K1 262 of the first drive 220 and not the content key K2 282 of the second drive 240. Thus, a third drive (not shown), which will reproduce the encrypted contents E(K1, Contents) 254 from the second disc 250, must be informed that the encrypted contents E(K1, Contents) 254 was encrypted using the content key K1 262, not the content key K2 282. Therefore, the second disc 250 further stores a disc copy flag 296 that represents such information. The disc copy flag 296 is recorded in a lead-in section of the second disc 250. For instance, when the disc copy flag 296 is set to a predetermined value, e.g., 1, it must be understood that the contents E(K1, Contents) 254 is encrypted using the content key K1 262 content key reproduced from the first disc 210, not the second disc 250 that stores the contents E(K1, Contents) 254.

Figure 3:
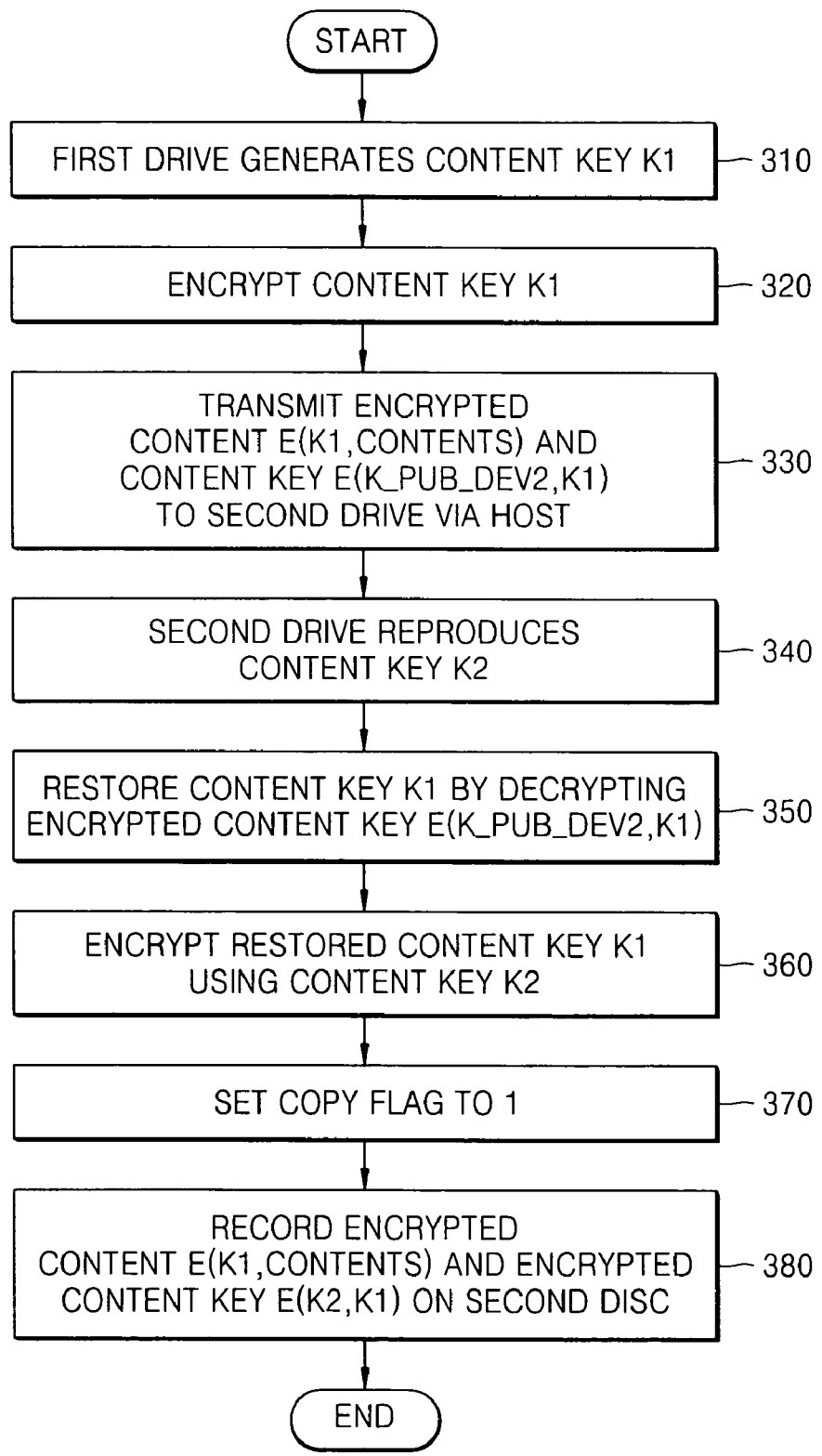
FIG. 3 is a flowchart illustrating the method of FIG. 2.

FIG. 3 is a flowchart illustrating the method of FIG. 2. Referring to FIG. 3, the first drive 220 reproduces the content key K1 262 (step 310). Next, the first drive 220 encrypts the content key K1 262 using the public key K_pub_dev2 264 of the second drive 240 (step 320). The public key K_pub_dev2 264 of the second drive 240 is transmitted from the second drive 240 to the first drive 220 using the public key infrastructure before encrypting the content key K1 262.

After step 320, the content E(K1, Contents), which is encrypted and recorded on the first disc 210, and the encrypted content key E(K_pub_dev2, K1) 272 of the first drive 210 are transmitted to the second drive 240 via the host 230 (step 330).

Next, the second drive 240 reproduces the content key K2 282 (step 340).

Next, the second drive 240 restores the content key K1 291 of the first drive 220 by decrypting the encrypted content key E(K_pub_dev2, K1) 272 of the first drive 220 using the private key K_pri_dev2 284 of the second drive 240 (step 350).

The restored content key K1 291 of the first drive 220 is encrypted using the content key K2 282 (step 360).

Next, the second drive 240 sets the disc copy flag 296, which is recorded in the lead-in section of the second disc 250, to 1 (step 370).

Next, the second drive 240 records the encrypted content E(K1,Content) transmitted from the host 230 and the encrypted content key E(K2, K1) on the second disc 250 (step 380).

Returning to FIG. 2, the first drive 220 reproduces the content key K1 262 using the drive information 222 and the disc information 212 stored in the first disc 210, and the second drive 240 reproduces the content key K2 282 using the drive information 242 and the disc information 252 stored in the second disc 250.

Figure 4:
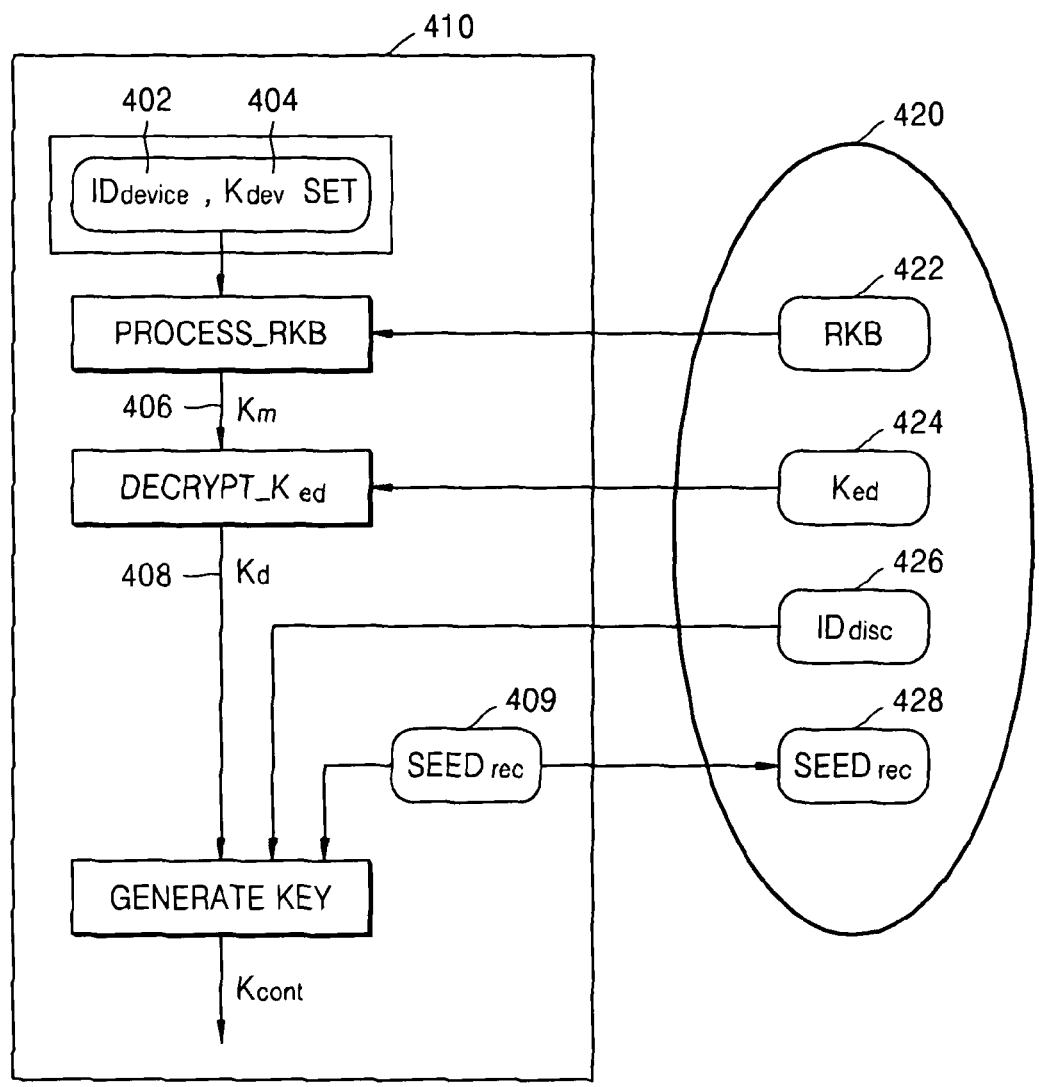
FIG. 4 illustrates a method of generating respective content keys using a first drive and a second drive, according to an embodiment of the present invention.

A method of generating a content key using a drive, according to an embodiment of the present invention, will now be described with reference to FIG. 4. FIG. 4 illustrates a method of generating a content key $K_{cont}$ using a drive 410 based on information stored in a disc 420 loaded into the drive 410. The content key $K_{cont}$ corresponds to the content key K1 262 of the first drive 220 of FIG. 2 or the content key K2 282 of the second drive 240 of FIG. 2. If the content key $K_{cont}$ is the content key K1 262, it can be used to encrypt contents, and if the content key $K_{cont}$ is the content key K2 282, it can be used to encrypt a content key that is used to encrypt contents.

In FIG. 4, a device identifier $ID_{device}$ 402, a device key set $K_{dev}$ 404, recording random number $Seed_{rec}$ 409, and a media key $K_m$ 406 correspond to the disc information 212 or 252 of FIG. 2. A renewal key block 422, an encrypted disk key $K_{ed}$ 424, and a recording random number $Seed_{rec}$ 428 correspond to the disc information 212 or 252 of FIG. 2. Here, a device denotes a recording/reproducing apparatus that includes a disk drive.

The device identifier $ID_{device}$ 402 is an identification number of a disk drive (not shown), and the device key set $K_{dev}$ 404 is a set of keys that are stored in series in the disk drive during disk manufacture so as to prevent the disk drive from being illegally copied. The renewal key block 422 is information that is provided to authorized disc drives by a content provider so as to allow only the authorized disk drives to generate the media key $K_m$ 406. That is, the renewal key block 422 and the device key set $K_{dev}$ 404 prevent the media key $K_m$ 406 from being reproduced by unauthorized disk drives. When an illegally copied disc drive is detected, the renewal key block 422 is updated and provided to authorized disc drives, thereby preventing the illegally copied disk drive from reproducing information stored in the disc 420.

The media key $K_m$ 406 is generated in the drive 410, using the device identifier $ID_{device}$ 402, the device key set $K_{dev}$ 404, and the renewal key block 422 that is read from the disk 420. Also, a media key generation algorithm does not allow an illegally copied disk drive to reproduce the media key $K_m$ 406. Such a media key generation algorithm is well known to an ordinary skilled person in the art, and thus, a detailed description thereof will be omitted here.

The encrypted disk key $K_{ed}$ 424, which is encrypted and stored in the disc 420, is used to protect a copyright of content or provide information regarding a disk manufacturer. A disk key $K_d$ 408 is encrypted using the media key $K_m$ 406 and stored in the disc 420 by a disk manufacturer. The disk key $K_d$ 408 is encrypted in the drive 410 using the media key $K_m$ 406.

The recording random number $Seed_{rec}$ 409 is a random number generated for every transaction. The recording random number $Seed_{rec}$ 409 is generated in the drive 410 to be used in reproducing the content key $K_{cont}$ and recorded in the disk 420 so that a drive other than the drive 410 can reproduce the content key $K_{cont}$.

A disk identifier $ID_{disc}$ 426, which is a disk identification number, is recorded in a lead-in section of the disk 420.

All or parts of the above disc information and drive information may be used to generate the content key $K_{cont}$. Whether the disc information or the drive information will be used to generate the content key $K_{cont}$ is determined by an encrypting policy. For instance, when the information regarding the disk manufacturer is not required in determining whether the content key $K_{cont}$ is available or not, the encrypted disk key $ID_{disc}$ 426 is neither stored in the disk 420 nor used in generating the content key $K_{cont}$.

Authorized devices are given the same device key set $K_{dev}$ 404 and media key $K_m$ 406 of the drive information. Only the disk key $ID_{disc}$ 426 and recording random number $Seed_{rec}$ 428 of the disc information can be used to identify the disk 420. Therefore, even if the disk 420 is loaded into a drive other than the drive 410, the content key $K_{cont}$ can be reproduced when the drive other than the drive 410 is determined to be authentic.

Figure 5:
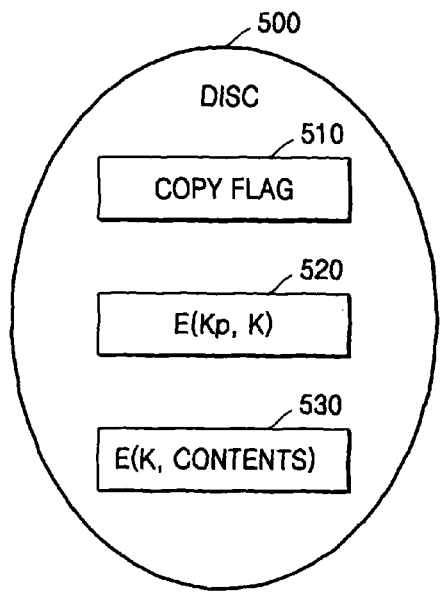
FIG. 5 illustrates a data structure of one recordable disc on which data stored in another disc is copied, according to an embodiment of the present invention.

FIG. 5 illustrates a data structure of a recordable disc 500 to which encrypted content E(K, Contents) is copied from the original disc (not shown), according to an embodiment of the present invention. Referring to FIG. 5, a copy flag 510 indicates that the encrypted content E(K, Contents) recorded on the disc 500 is encrypted using a content key K of the original disc, not a content key Kp of the disc 500. A drive (not shown), which will reproduce the encrypted content E(K, Contents) from the disc 500, refers to the copy flag 510. Here, the content key Kp of the disc 500 is reproduced based on disc information stored in the disc 500 by a disc drive (not a disc drive used for data copy), and the content key K of the original disc is reproduced based on disc information stored in the original disc.

The copy flag 510 and the encrypted key E(Kp, K) 520 are stored in a predetermined section of the disc 500. In this embodiment, the predetermined section may be a lead-in section or a reserve section of the disk 500.

Figure 6:
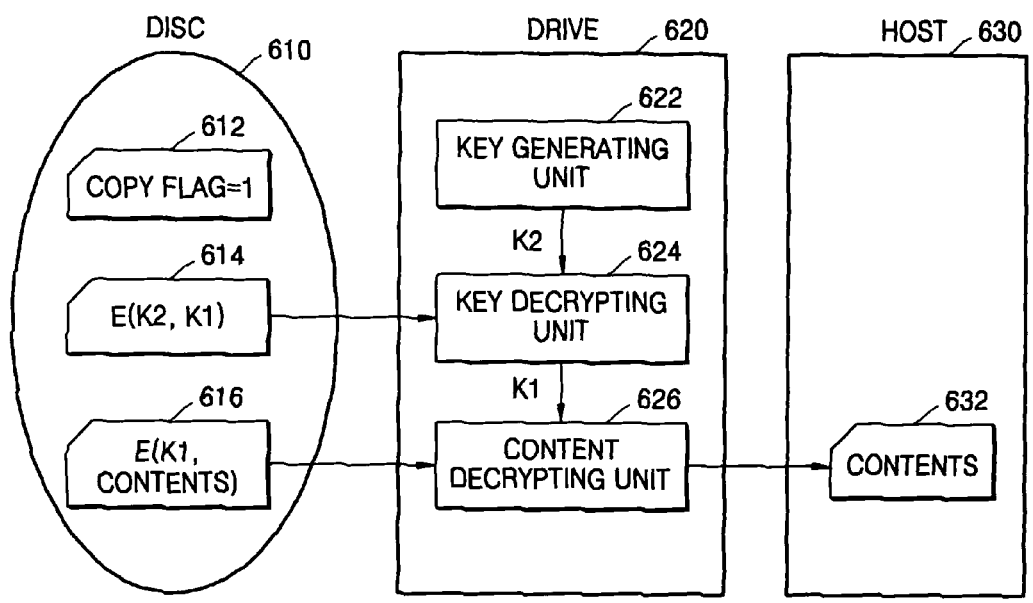
FIG. 6 illustrates a method of reproducing data copied to a storage medium using a drive, according to an embodiment of the present invention.

FIG. 6 is a diagram illustrating a method of reproducing encrypted contents E(K1, Contents) 616 from a disc 610 to which information stored in the original disc is copied, using a drive 620 other than a drive used for data copy. The disc 610 is a copied disc corresponding to the disc 250 of FIG. 2.

Unlike conventional disc copy methods, the disc 610 further stores a copy flag 612 and encrypted content keys E(K2, K1) 614, in addition to the encrypted contents E(K1 Contents) 616.

The drive 620 includes a key generating unit 622, a key decrypting unit 624, and a content decrypting unit 626. When the disc 610 is loaded into the drive 620, the key generating unit 622 reproduces a content key K2 based on disc information stored in the disc 610 and drive information regarding the drive 620.

The key decrypting unit 624 reads the encrypted content key E(K2, K1) 614 from the loaded disc 610 and reproduces a decrypted content key K1 by decrypting the encrypted content key E(K2, K1) 614 using the content key K2.

The content decrypting unit 626 reads the encrypted content E(K1, Contents) 616 from the disc 610, generates decrypted contents 632 by decrypting the encrypted content E(K1, Contents) using the decrypted content key K1, and sends the decrypted contents 632 to a host 630.

Figure 1:
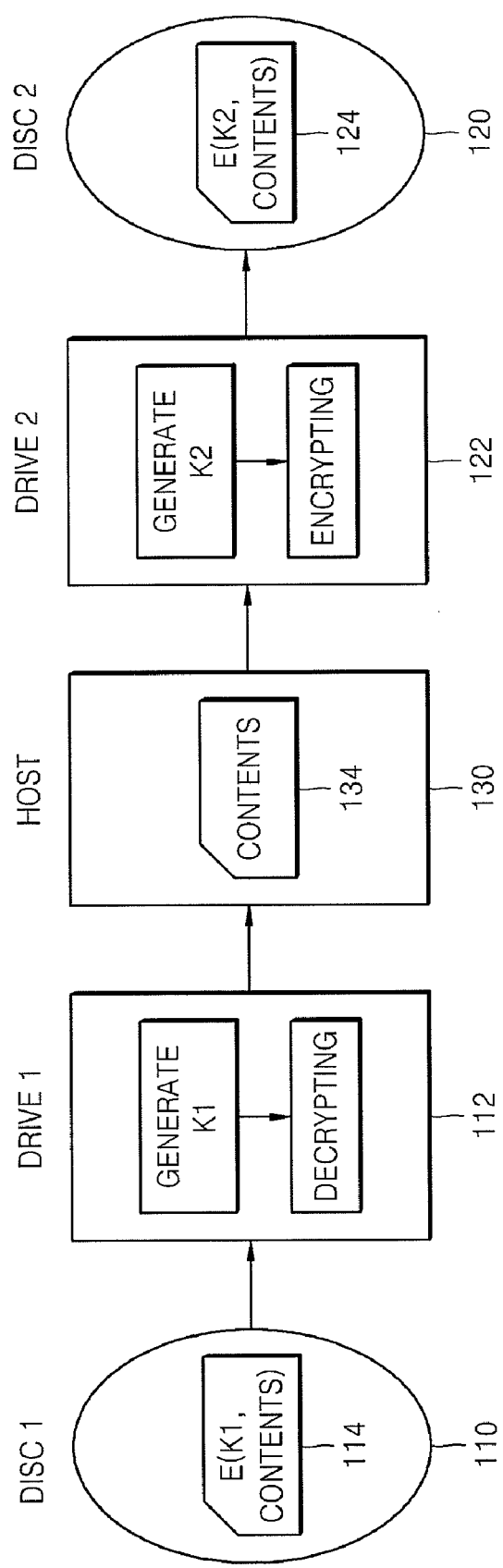
FIG. 1 illustrates a conventional method of copying data stored in one storage medium to another storage medium.

As described above, FIG. 6 illustrates a method of decrypting and reproducing the contents E(K1, Contents) encrypted using a content key of the original disc, not the content key K1 of the disc 610, i.e., a copied disc. Let us assume that the copy flag 612 is set to 1 when the contents E(K1, Contents) is encrypted using a content key of the original disc, not the content key K1 of the disc 610, and is set to 0 otherwise. If the copy flag 612 is set to 0, i.e., when the disc 610 is not a copied disc, the drive 620 reproduces the content key K2 and decrypts the encrypted contents E(K1, Contents) using the content key K2 as described with reference to FIG. 1.

Figure 7:
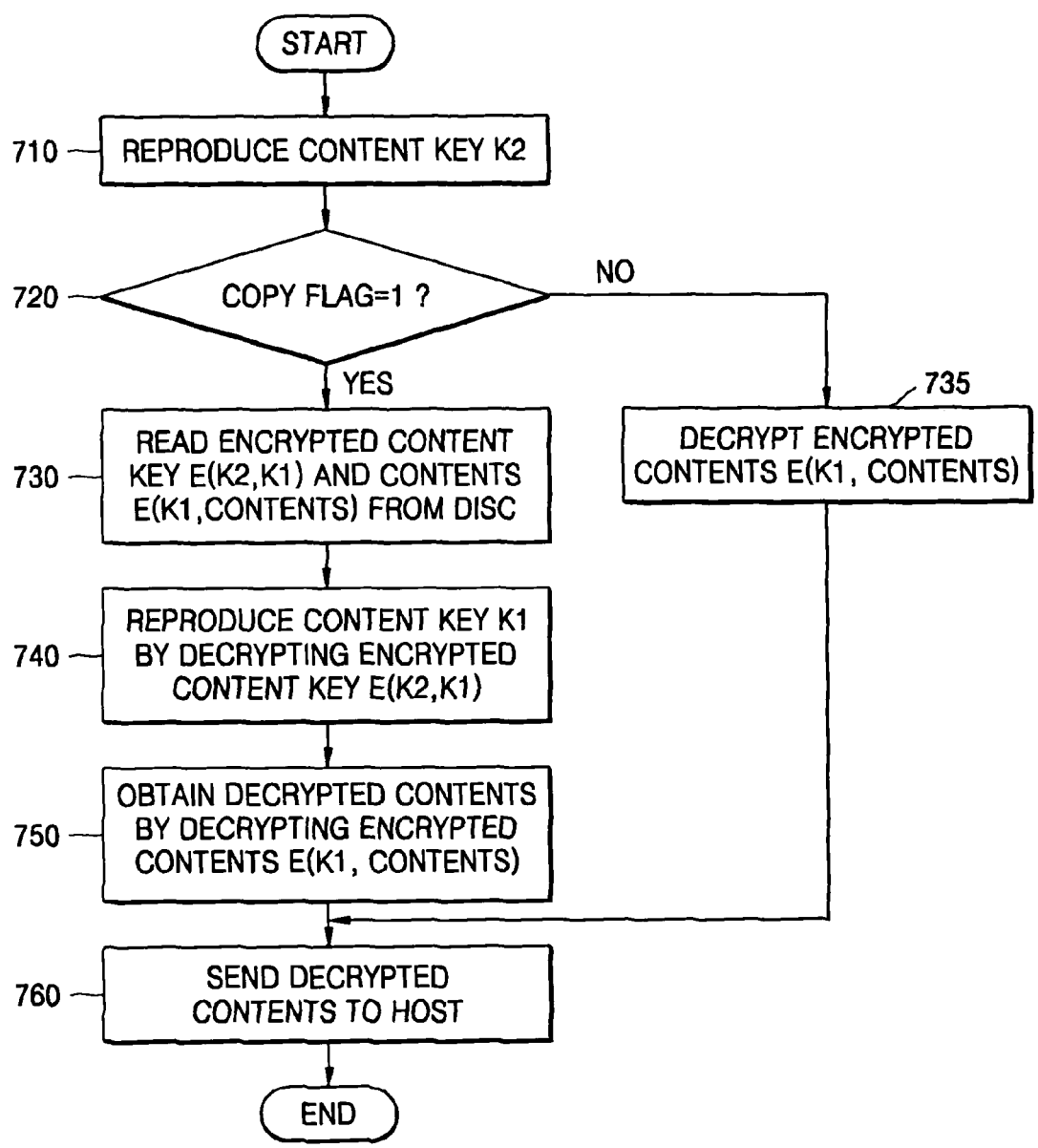
FIG. 7 is a flowchart illustrating a method of reproducing data copied to a storage medium, according to an embodiment of the present invention.

FIG. 7 is a flowchart illustrating the method of FIG. 6. Referring to FIG. 7, the disc 610, which is a copied disc, is loaded into the drive 620, the drive 620 reads disc information from the disc 610 and reproduces the content key K2 of the disc 610 based on the disc information and its drive information (step 710) as described with reference to FIG. 1.

Next, the drive 620 checks the copy flag 612 stored in a predetermined section of the disc 610 (step 720). If the copy flag 612 is set to 0, the drive 620 decrypts the encrypted contents E(K1, Contents) stored in the disc 610 using the content key K2 (step 735) and sends a result of decrypting to the host 630 (step 760).

If the copy flag is set to 1, the drive 620 reads the encrypted content key E(K2, K1) and the encrypted contents E(K1, Contents) from a predetermined section of the disc 610 (step 730).

Next, the drive 620 reproduces the content key K1 by decrypting the encrypted content key E(K2, K1) read in step 730, using the content key K2 reproduced in step 710 (step 740).

Next, the drive 620 obtains the decrypted contents 632 by decrypting the encrypted contents E(K1, Contents) using the content key K1 (step 750) and sends the decrypted contents 632 to the host 630 (step 760).

In the present invention, a storage medium includes a write-once storage medium or a rewritable storage medium such as a compact disc (CD), a digital versatile disc (DVD), and a blue-ray disc.

As previously mentioned, according to the present invention, encrypted data stored in a storage medium is sent to a host without decrypting the encrypted data, thereby preventing the data from being hacked by unauthorized users.

Also, encrypted data is copied from a first storage medium to a second storage medium without decrypting the encrypted data, thereby increasing a speed of copying the encrypted data.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of copying encrypted data stored in a first storage medium to a second storage medium the method comprising:

obtaining a first content key, operable to encrypt the encrypted data, using first disc information stored in the first storage medium, using a first drive into which the first storage medium is loaded;

transmitting the encrypted data stored in the first storage medium and the first content key to a second drive into which the second storage medium is loaded;

encrypting the first content key into a first encrypted first content key with a second content key obtained from second disc information stored in the second storage medium;

recording the transmitted encrypted data and the first encrypted first content key on the second storage medium; and recording a copy flag in a predetermined section of the second storage medium, the copy flag indicating that the encrypted data is not encrypted using the second content key and is copied on the second storage medium from the first storage medium 2. The method of claim 1, further comprising:

encrypting the first content key using a public key of the second drive into a second encrypted first content key before transmitting the first content key to the second drive; and decrypting the second encrypted first content key using a private key corresponding to the public key to generate the first content key after receiving the second encrypted first content key by the second drive.

3. The method of claim 1, wherein the predetermined section is a lead-in section.

4. The method of claim 1, wherein the first content key is obtained further based on first drive information stored in the first drive and the second content key us obtained further based on second drive information stored in the second drive.

5. The method of claim 4, wherein the first drive information and the second drive information comprises at least one of a device identifier, a device key set, a device key, and a random number.

6. The method of claim 1, wherein the first disc information and the second disc information comprises at least one of a disc identifier, a renewal key block, a media key, and a random number.

7. The method of claim 1, wherein the first content key uniquely corresponds to the first storage medium and the second content key uniquely corresponds to the second storage medium.

* * * * *